United States Patent [19]

Ross

[11] 3,949,558

[45] Apr. 13, 1976

[54] POWER UNIT

[76] Inventor: Bobby Lane Ross, 14122 Bonhom, Houston, Tex. 77015

[22] Filed: Apr. 25, 1975

[21] Appl. No.: 571,797

[52] U.S. Cl. .................. 60/721; 74/677; 74/687; 74/730
[51] Int. Cl.² .................. F03B 17/00; F03G 7/00
[58] Field of Search ........ 74/687, 677, 730; 310/66; 60/721

[56] References Cited
UNITED STATES PATENTS 3,733,931    5/1973    Nyman et al. .................. 74/687 X Primary Examiner—Allen M. Ostrager
Attorney, Agent, or Firm—Pravel & Wilson

[57] ABSTRACT

A new and improved low-speed, high-torgue power unit including a power means that is mounted on a drive wheel for rotation in a receptacle holding a body of fluid. The power means includes a propelling means which acts against the fluid body to rotate the drive wheel about a power output shaft on which the drive wheel is mounted. A movable gate means may be provided with the receptable to restrict circular flow of the fluid and increase thrust of the propelling means.

18 Claims, 6 Drawing Figures

POWER UNIT

BACKGROUND OF THE INVENTION

This invention relates generally to the field of power units and more particularly to a propelling means mounted on a drive wheel with the propelling means acting in conjunction with a body of fluid to rotate the drive wheel and produce a low-speed, high-torgue output.

The need for a low speed high torgue power unit is found in many applications. The common industrial applications would be, for example, in electric generator power plants, stationary power units, and in ship propulsion systems. The desired low-speed, high-torgue output can be achieved with the use of very large internal combustion engines. These types of engines, however, generally require a large capital outlay. These engines also require petroleum fuel or petroleum distillates, such as gasoline, diesel, propane, etc. and therefore, have exhaust emissions which add to the current air pollution problems and restrict their use in certain applications. A low-speed, high-torgue output can also be obtained by the use of reduction gearing. Such reduction gearing arrangements can also involve large expenditures and require a lubrication source and periodic maintenance.

This invention offers a solution to the need for a low-speed, high-torgue power unit without the need for a very large power unit or reduction gearing. A relatively small conventional electrical motor can be used as a power source. This power source eliminates the problems of exhaust emissions which occur when a conventional internal combustion engine is used. The low cost of this power unit enables it to be purchased for use as an auxiliary or backup power unit. A minimum of moving parts is required for this engine and hence maintenance costs are reduced.

SUMMARY OF THE INVENTION

A power unit including an electric motor mounted on a drive wheel for rotation in a body of fluid contained in a housing that surrounds the drive wheel. The electric motor includes a propeller with plural blades that act against the body of fluid to provide a driving reaction to rotate the drive wheel. The drive wheel includes a central hub portion and an outer tubular portion that substantially corresponds in cross-section to that of the electric motor to minimize the fluid resistance to the movement of the motor and drive wheel through the body of fluid. Gate means are provided in the path of the propeller means to close off the space between the drive wheel tubular portion and the tubular portion of the housing for restricting circular flow of the body of fluid and, hence, to increase the reaction thrust of the power means. The gate means is moved out of the path of the propeller means as it passes thereby.

An object of this invention is to provide a new and improved power unit.

Another object of this invention is to provide a new and improved method of converting electrical energy to mechanical energy.

BRIEF DESCRIPTION OF THE DRAWING

FIG. 5 illustrates the propeller means.

FIG. 6 is a broken section of the drive wheel means.

DESCRIPTION OF THE PREFERRED EMBODIMENTS

Figure 1:
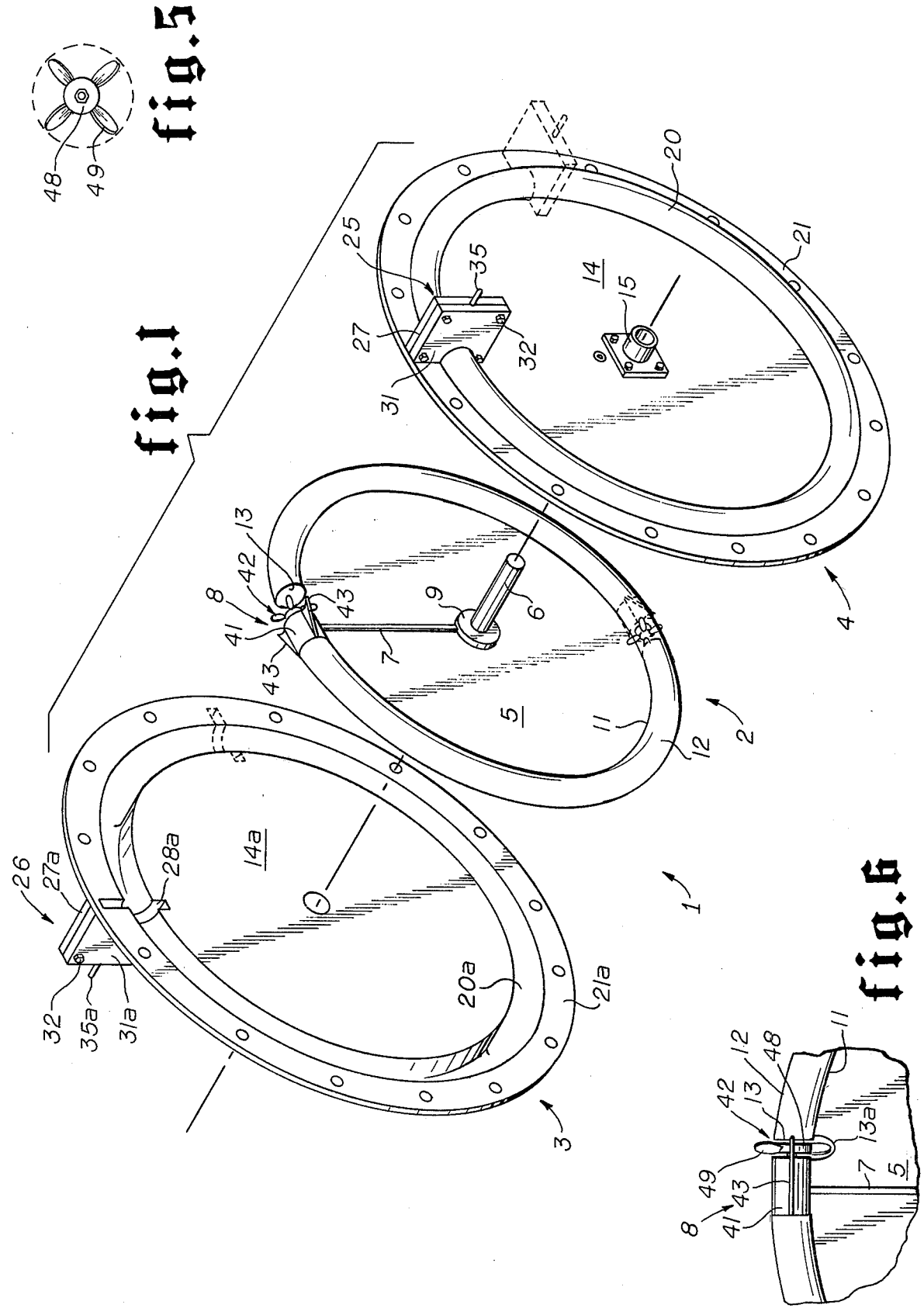
FIG. 1 is an exploded view of the housing and drive well assemblies.

The drawings shown a power unit that is generally designated 1. The main components of the power unit include a drive wheel means 2 and housing means 3 and 4.

The drive wheel means 2 includes a central hub portion 5 mounted for rotation with output drive shaft 6. The hub portion is preferably a solid disk with smooth sidewalls to minimize fluid friction with the body of fluid to be described hereafter. The hub portion may include an electrical wire channel or conduit 7 through which is extended an electrical wire to supply power to the electrical power means generally designated 8. Alternatively, the hub portion could comprise two parallel disk-like portions with sufficient spacing therebetween to provide for passage of the electrical wire. A conventional slip ring arrangement generally designated as 9 may be used to connect to an electrical supply wire 10 extending through the housing. Other types of arrangements to supply electrical power to the power means will be apparent to those skilled in the art and may be used in place of the slip ring arrangement. A rheostat-type switch may be used to control the electric current going to the electrical supply wire to control the speed of the power means. It is contemplated that the power means may be reversible to act as a brake or provide a reverse output for the drive shaft. Attached to the outer periphery 11 of the drive wheel hub portion is a substantially cylindrical tubular portion 12 which includes an end portion 13 that is closely spaced to the power means to reduce the gap therebetween to reduce any turbulence. Notch 13a is provided in the hub portion for a propeller means as described hereafter. The tubular portion 12 substantially corresponds in cross-section to that of the power means to minimize fluid resistance to movement of the power means and drive wheel through the body of fluid. The tubular portion may be constructed from convoluted flexible metal tubing that is attached to the hub portion periphery by any suitable means such as welding. Alternatively, the central hub portion and tubular portion may be made from a single casting. The tubular portion would be solid when constructed from a casting with its increased weight acting as a flywheel. Fabrication of the central hub portion and tubular portion by assembling from components or casting as a single unit depends upon such variables as cost and desired operating features of the power unit.

Figure 3:
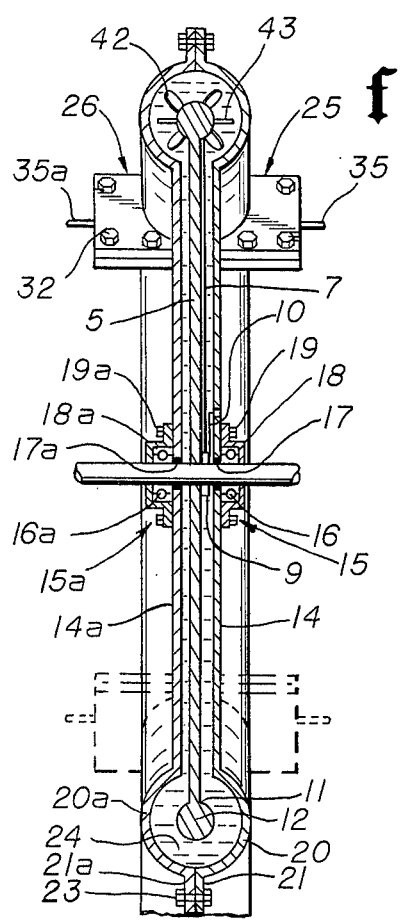
FIG. 3 is a vertical cross section through the housing and drive wheel.
Figure 4:
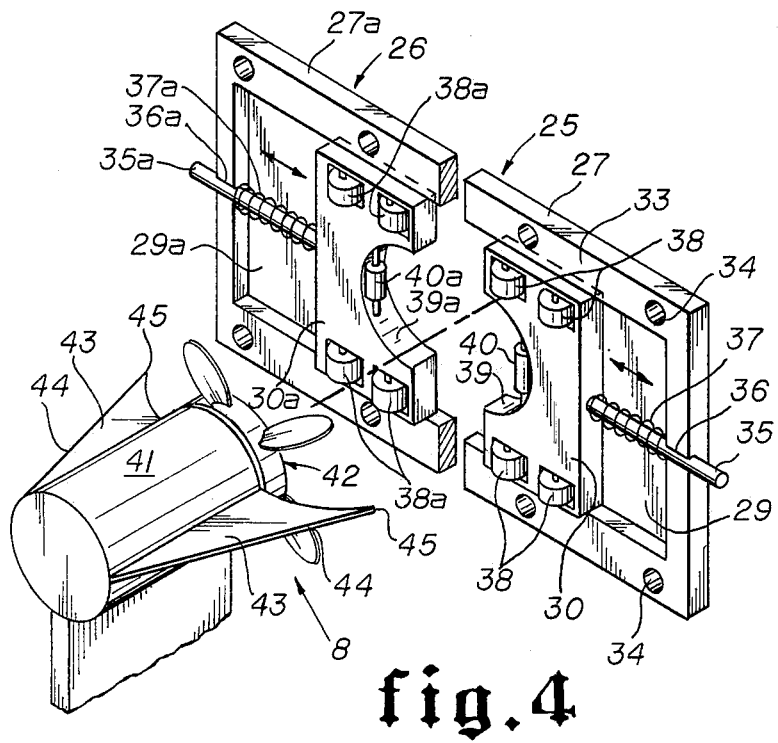
FIG. 4 illustrates the sliding gates.

The housing means 4 includes a central portion 14 and a bearing means 15 for supporting the output shaft for rotation. The bearing means includes conventional ball bearings 16 and a seal means 17 that prevents leakage of the body of fluid to be described hereafter. The bearing housing 18 is attached to the housing central portion by bolt means 19. Substantially cylindrical housing tubular portion 20 is connected with the housing central portion and forms half of a receptacle when connected with the other housing member 3. A housing flange member 21 is formed with the tubular portion 20 for connection with the other housing flange portion 22 by suitable means such as bolt means 23. Suitable seals or gaskets may be provided at the flanges. Connecting the two housing means together as shown in FIG. 3 forms a receptacle with a substantially cylindrical chamber holding a body of fluid 24.

The components of the housing means 3 are similar to the components of housing means 4. Accordingly, components of housing means 3 are designated by the corresponding reference numeral of like components of housing means 4 with the addition of *a* after the reference numeral in the drawing. Since the housing means are essentially mirror images of each other, only a detailed description of housing means 4 is given.

A suitable power unit support member 22 is provided to support the power unit 1. Additional support bracing (not shown) may be provided for the power unit as needed.

The fluid preferably comprises a low viscosity fluid which may possess lubricating properties and a freezing point below that of the freezing point of the environment in which it is used. Water, or antifreeze, or low viscosity oils are suitable fluids. Suitable draining and filling means (not shown) are provided in the housing for filling and draining the fluid from the housing.

Gate means 25 and 26 are provided on the housing means 4 and 3, respectively. Gate means 25 includes a guide member 27 that is fixed to the housing means such as by welding adjacent an opening in the housing. Recessed portion 29 in the guide member forms a guide for movable gate member 30. Removable guide member 31 also includes a recessed portion similar to recess portion 29 such that connection of the guide members 27 and 31 by suitable connectors such as bolt means 32 inserted in aperatures 34 provides a sealed guide supporting the movable gate means for sliding movement. Suitable gasket or seal means may be provided between surface 33 on guide member 27 and similar surface on the guide member 31 to prevent leakage of the fluid.

Sliding gate member 30 is mounted for sliding movement in the recesses of the guide members. Guide rod 35 is connected to the gate member and is slidably mounted in aperature 36 formed in the two guide members. Suitable seal means may be provided between the guide rod and aperature. A coil spring 37 or other suitable biasing means urges the gate inwardly to a first position adjacent the tubular portion of the drive wheel. Roller means 38 are rotatably mounted in aperatures that extend through the sliding gate member and contact the recess portion 29 in guide member 27 and the other recess portion in the guide member 31. The roller means 38 reduce the sliding friction of the gate member to facilitate its sliding movement in the recesses. Gate member 30 includes a notch portion 39 which generally conforms to the cross-section of one-half of the drive wheel tubular portion 12. A roller means 40 is mounted in the notched portion of the gate member for a purpose hereafter described.

Gate means 26 includes a guide member 27a that is attached to the housing means 3 adjacent opening 28a and includes the recessed portion 29a for receiving the sliding gate member 30. A removable guide member 31a includes a similar recess for receiving the sliding gate member and is attached to the fixed guide member by bolt means 32 as noted in the description of gate means 25. Sliding gate member 30a includes a guide rod 35a slidably mounted in aperature 36a extending through the guide members. Suitable seal means may be provided between the guide rod and the guide member aperature to prevent leakage of the fluid body. Coil spring 37a or other suitable biasing means is provided to urge the gate member 30a inwardly to a first position adjacent the tubular portion of the drive wheel. Roller means 38a engage the recesses in the guide members to reduce friction. The gate member includes a notch portion 39a that conforms generally to one side of the drive wheel tubular portion 12. Roller means 40a is also provided for the same purpose as roller means 40. Bolt means 32 are inserted through aperatures 34 to connect the guide members 27a and 31a with suitable gasket means provided as with guide members 27 and 31.

The power means 8 includes an electrical motor 41 mounted adjacent the periphery of the drive wheel hub portion at the interrupted portion of the tubular member 12. Power is supplied to the motor via conduit 7 and slip ring arrangement 9. The electric motor is sealed to allow its operation in the fluid body 24. Propeller 42 is mounted on the shaft of the electrical motor for rotation in the fluid body to provide a driving reaction force for the drive wheel. The pitch and design of the propeller blades may be varied to give an optimum driving force to the drive wheel in particular applications. As shown in FIG. 5, the propeller includes a mounting disk 48 which is of the same diameter as the power means and drive wheel tubular portion to reduce turbulence in the area of the end portion 13. The close spacing reducing the gap between the drive wheel tubular portion and the mounting disk also reduces undesired turbulence. A plurality of propeller blades 49 are mounted on the mounting disk. Cam blades 43 are attached to the power unit and each include a cam surface 44 extending outwardly and rearwardly from the power unit to a release point 45 adjacent the outer tips of the propeller blades to prevent contact between the blade tips and the gate means. The cam surfaces 44 engage the roller means 40 and 40a as the drive wheel passes the gate means to slide the gate means outwardly to a second position away from the path of the propeller means 42. When the release points 45 of the cam surfaces move past the roller means 40 and 40a, the gate members 30 and 30a are returned to said first position inwardly to the point adjacent the drive wheel tubular portion 12 to substantially close off the space between the drive wheel tubular portion and the housing tubular portion in order to prevent circulation of the fluid body. Restricting circulation of the fluid body, which tends to occur from the reaction force of the propeller means, provides additional push to the drive wheel to increase the efficiency of the power unit. Alternatively, suitable arrangements including a mechanical linkage driven by the drive shaft could be used to slide the gate means from the path of the propeller means.

Figure 2:
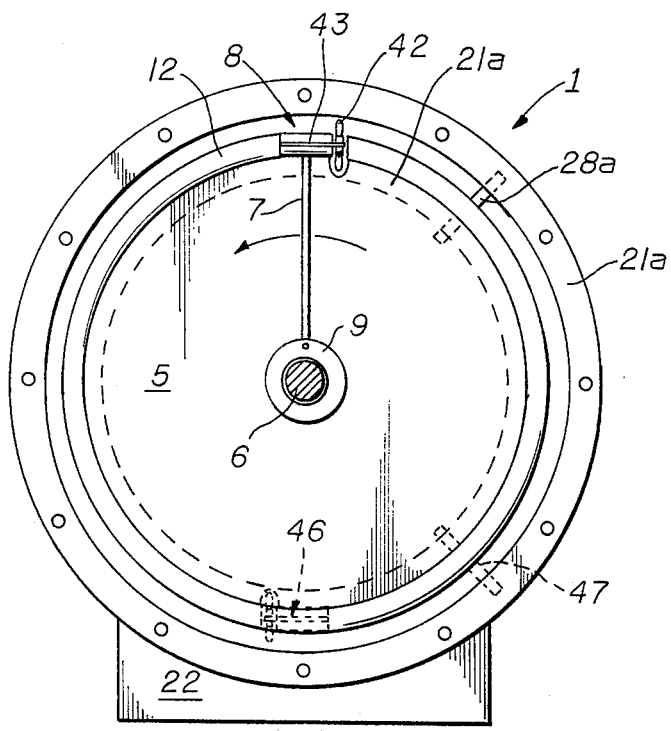
FIG. 2 is a side view of the power unit with the housing means 4 removed.

As shown in FIG. 2 a second power means 46 and a second gate means 47 may be provided to increase the power of the power unit. More than two power means and gate means may also be provided for additional power. The plural gate means are spaced apart a different amount (for instance 90°) than the power means (shown at 180°) so that both gate means will not be opened at the same time. This different spacing helps to further reduce circular flow of the fluid. Plural gate means could also be used when a single power means is provided. Several power units may be mounted in series for applications requiring large amounts of power.

The above described power unit provides a high torque, low speed output that finds use in many applications. It provides this desired result through an economical, low maintenance system.

The foregoing disclosure and description of the invention are illustrative and explanatory thereof, and various changes in the size, shape, and materials as well as in the details of the illustrated construction may be made without departing from the spirit of the invention.

I claim:
1. A power unit including:
a receptacle for holding a body of fluid;
a drive wheel means mounted for rotation in said body of fluid about a drive shaft;
said drive wheel means including a power means mounted on said drive wheel means and radially spaced from said drive shaft for rotational movement through said fluid body in said receptacle;
said power means including a propelling means which acts against said fluid body to provide a driving reaction force to rotate the drive wheel about the drive shaft.
2. The power unit of claim 1 wherein:
said power means includes an electric motor.
3. The power unit of claim 1 wherein:
said propelling means includes a plurality of propeller blades that act against the fluid body to propel the power means through the fluid body.
4. The power unit of claim 1 wherein:
the receptacle defines a housing containing the fluid body through which the propelling means is moved.
5. The power unit of claim 1 including:
a gate means movably mounted in the receptacle in the path of movement of the propelling means to restrict circulation of the fluid body to provide additional power to the drive wheel.
6. The power unit of claim 5 including:
cam means mounted on the drive wheel to engage the gate means and move the gate means out of the path of the propelling means as the propelling means passes the gate means.
7. The power unit of claim 5 wherein:
said gate means is spring-biased into the path of movement of the propelling means.
8. The power unit of claim 6 including:
roller means mounted on the gate means to engage the cam means as it passes the gate means.
9. The power unit of claim 1 wherein:
said body of fluid comprises a low viscosity fluid.
10. The power unit of claim 1 wherein:
said body of fluid comprises water.
11. The power unit of claim 1 wherein:
said drive wheel includes a hub portion mounted on said drive shaft for rotation in the housing therewith; and
a mounting portion connected to the hub portion for rotation through the fluid body in the receptacle.
12. The power unit of claim 11 wherein:
the mounting portion is of substantially the same cross-section as the power means and mounted substantially coextensive therewith to reduce resistance to the rotation of the drive wheel and power means through the fluid body.
13. The power unit of claim 1 wherein:
said receptacle defines a substantially closed housing containing said fluid body; and
said housing including a substantially cylindrical chamber through which the propelling means is moved.
14. The power unit of claim 13 including:
a gate means movably mounted on said housing in the path of movement of said propelling means to substantially close off the space between said drive wheel means and said cylindrical chamber to restrict circulation of said fluid body to provide additional power to the drive wheel.
15. The power unit of claim 5 wherein:
plural gate means are mounted in the receptacle.
16. The power unit of claim 1 wherein:
plural power means are proved on said drive wheel means.
17. The power unit of claim 12 wherein:
said propelling means includes a mounting means with a plurality of propeller blades; and
said mounting means having substantially the same cross-section as said power means and said mounting portion.
18. The power unit of claim 17 wherein:
the gap between said mounting means and said drive wheel tubular portion is relatively small to reduce any turbulence in said gap.

* * * * *